J. JUCH.
MUSICAL SPELLING TABLET.
No. 172,268. Patented Jan. 18, 1876.
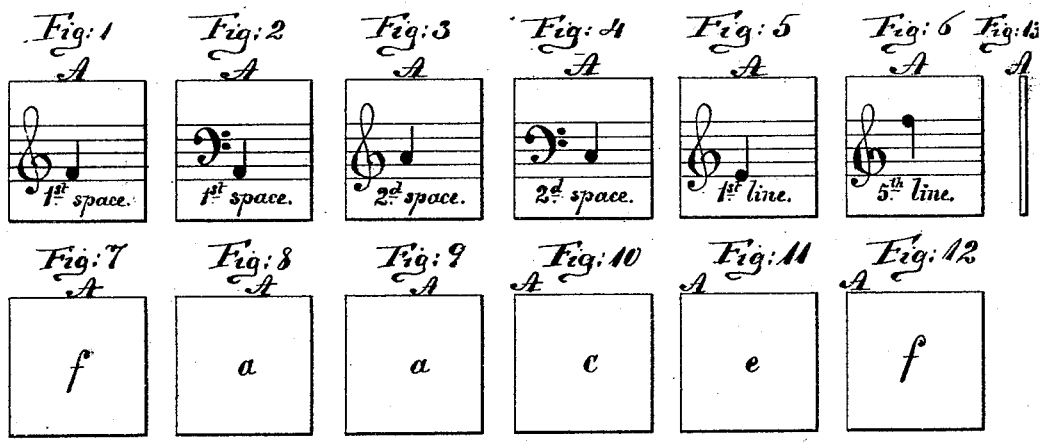

UNITED STATES PATENT OFFICE.

JUSTIN JUCH, OF NEW YORK, N. Y.

IMPROVEMENT IN MUSICAL SPELLING-TABLETS.

Specification forming part of Letters Patent No. 172,268, dated January 18, 1876; application filed November 27, 1875.

*To all whom it may concern:*

Be it known that I, JUSTIN JUCH, of New York city, in the county and State of New York, have invented a new and Improved Musical Spelling-Tablet, of which the following is a specification:

This invention has for its object to produce a block or tablet by means of which the elements of music may be readily imparted to children.

The invention consists of a tablet or block which bears on its face the representation of a musical character, such as the staff, one or more notes, the clef or clefs, or any one or more of such characters united, and on another side the explaining letter or name of such note or other character, so that a child, upon observing the first-mentioned face, may notice the position or kind of note, or clef, or other character, and test the memory with regard to the name of the same, and by thereupon turning the tablet ascertain whether the proper name of the note had been remembered. The tablets will also permit the child to place the notes into a scale, or, in fact, to compose small pieces of music.

In the drawing, Figures 1 to 6 represent face views of six of my improved musical spelling-tablets. Figs. 7 to 12 are reverse views of the same, respectively. Fig. 13 is an edge view of one of the tablets.

Similar letters of reference indicate corresponding parts in all the figures.

Each tablet A is made of quadrangular or equivalent form, and contains on its face the representation of one or more musical characters—as, for example, the staff, and one or more notes, as in Figs. 1 to 6. For more advanced children the clef is also added, as in the same figures, so that a child may learn that the denomination of a note in a given position is changed by the clef, as in Figs. 1 and 2, where the same note, *f*, when read by the G-clef becomes *a* when read by the F or bass-clef. The same tablets can also be used to show the distinction between whole, half, quarter, sixteenth, &c., notes, and to illustrate other musical characters. Every tablet contains on its reverse, or, if made thicker than represented in Fig. 13, on any one of its sides other than the face referred to, the explanation of the diagram contained on such face. Thus, the reverse of the tablet shown in Fig. 1 has the letter *f* marked upon it, as Fig. 7, to show that such is the name of the note represented on the face, but other words or marks explanatory of the diagram on the face may be used, such as staff, where only a staff is printed on the face, F-clef, G-clef, quarter-note, and the like. The pupil may attempt to read the face of the tablet, and can thereupon refresh his memory, or test the accuracy thereof, by referring to the explanation of the reverse of the tablet.

I am aware aware that musical characters have heretofore been applied to blocks—as, for example, in the patent of C. J. and J. Costello of June 28, 1870—but such blocks do not contain the explanation of a note or musical character on a side different from that to which such note or character was applied, but either contained no explanatory mark or letter whatsoever, or had the explanation on the same side with the note to which it referred.

I claim as my invention—

The musical spelling-tablet A, containing on one face a musical character or characters, and on a different face the letter or mark explanatory of the character or characters on said face, substantially as specified.

JUSTIN JUCH.

Witnesses:
 ERNEST C. WEBB,
 F. V. BRIESEN.